United States Patent
Norwood

(12) 
(10) Patent No.: US 6,385,362 B1
(45) Date of Patent: May 7, 2002

(54) HYBRID INTEGRATED OPTICAL ADD-DROP MULTIPLEXER

(75) Inventor: Robert A. Norwood, West Chester, PA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/658,469

(22) Filed: Sep. 8, 2000

Related U.S. Application Data

(60) Provisional application No. 60/152,862, filed on Sep. 8, 1999.

(51) Int. Cl.⁷ ................................................. G02B 6/12
(52) U.S. Cl. .............................. 385/14; 385/24; 385/37; 385/16; 359/128; 359/130
(58) Field of Search ............................. 385/14–24, 16, 385/37; 359/124, 119, 127, 130, 128

(56) References Cited

U.S. PATENT DOCUMENTS

| | | | |
|---|---|---|---|
| 5,546,483 A | * | 8/1996 | Inoue et al. ............... 385/14 |
| 5,857,039 A | * | 1/1999 | Bosc et al. ............... 385/14 |
| 5,859,941 A | | 1/1999 | Horita et al. ............... 385/37 |
| 6,084,050 A | | 7/2000 | Ooba et al. ............... 528/42 |
| 6,091,870 A | | 7/2000 | Eldada ............... 385/37 |
| 6,122,416 A | * | 9/2000 | Ooba et al. ............... 385/16 |

* cited by examiner

*Primary Examiner*—Phan T. H. Palmer
(74) *Attorney, Agent, or Firm*—Nixon Peabody LLP; Thomas W. Cole

(57) ABSTRACT

An integrated optical add/drop multiplexer (OADM) comprising a multilayer stack formed to add and drop specific information-carrying wavelengths propagating within a fiber optic communication network. The stack comprises a first layer comprising a silicon or silica substrate, a second layer comprising an undercladding layer, a third layer comprising a core glass layer, and a fourth layer comprising an overcladding layer. In another embodiment, the stack comprises a first layer comprising a silicon or silica substrate, a second layer comprising an undercladding layer, a third layer comprising a polymer layer, a fourth layer comprising a core glass layer, and a fifth layer comprising an overcladding layer.

33 Claims, 3 Drawing Sheets

HYBRID INTEGRATED OPTICAL ADD-DROP MULTIPLEXER

This application claims the benefit of U.S. application Ser. No. 60/152,862, filed Sep. 8, 1999, and entitled "Hybrid Integrated Optical Add-Drop Multiplexer" whose content is incorporated by reference in its entirety.

TECHNICAL FIELD

This invention relates to photonic modules that have the ability to add and drop specific information-carrying wavelengths propagating within a fiber optic network, hereinafter referred to as optical add/drop multiplexers (OADM).

BACKGROUND

Optical add/drop multiplexers (OADM) have the ability to add and drop specific information-carrying wavelengths propagating within a fiber optic network. A block diagram illustrating how an OADM 1 functions to add wavelengths $\lambda'_i \ldots \lambda'_j \ldots \lambda'_k$ and drop wavelengths $\lambda'_i \ldots \lambda'_j \ldots \lambda'_k$ from an input $\lambda_1 - \lambda_N$ is shown in FIG. 1.

A widely discussed architecture for OADMs involves using arrayed waveguide grating (AWG) routers and 2×2 optical switches. This architecture is schematically shown in FIG. 2. Here, AWGs 12 are used as multiplexers/demultiplexers and switches 14 are used for selecting the channels to be added and dropped. This architecture can be made with commercially available, stand-alone components (e.g., a fiber pigtailed AWG that is then connected to fiber pigtailed switches by fusion splicing and connector attachment). AWGs are produced commercially by, for example, Hitachi, Lucent, Nortel, SDL, and JDS Uniphase. 2×2 switches, in both opto-mechanical and thermo-optical varieties, are produced commercially by vendors such as JDS Uniphase, Fitel, Dicon, and Corning.

Unfortunately, the architecture illustrated in FIG. 2 has a number of shortcomings. This architecture is difficult to assemble due to the number of fiber connections, and is expensive. In addition, this architecture suffers from a high insertion loss. Furthermore, this architecture scales very poorly as the number of wavelengths is increased. Metropolitan area network applications, for example, may demand that 32, 64 or 80 wavelengths be added or dropped in a given OADM.

To solve these problems, attempts have been made in the prior art to integrate the filtering function of AWGs and the switching function of switches on a single substrate. One such attempt, using a planar glass technology, is described by K. Okamoto et al. in their paper entitled, "16-Channel Optical Add/Drop Multiplexer Consisting of Arrayed Waveguide Gratings and Double Gate Switches," *Electronic Letters* 32, 1471 (1996). Here, several AWGs were made in planar glass (silica on silicon) on the same substrate, and Mach-Zehnder-based thermo-optic switches were integrated on the same substrate. Unfortunately, there are several disadvantages to this approach. Mach-Zehnder-based switches require a large amount of area on the chip. In addition, Mach-Zehnder-based switches are very sensitive to fabrication errors and suffer from poor isolation.

Another attempt toward an integrated OADM has been described by Giles et al. in their paper entitled, "Reconfigurable 16-Channel WDM Drop Module Using Silicon MEMS Optical Switches," *IEEE Photonics Tech. Lett.* 11, 63 (1999). Here, AWGs are fiber-coupled to an array of MEMS-type switches. Unfortunately, this approach is not fully integrated and is not solid-state.

Clearly, there is a need for a solid-state OADM that is fully integrated on a single substrate and not sensitive to fabrication errors. Ideally, the switches used in such an OADM should not require large areas on the chip and should further have good isolation characteristics.

SUMMARY OF THE INVENTION

The present invention provides an integrated, high performance optical add/drop multiplexer (OADM) comprising a multilayer stack whose function is to add or drop specific information-carrying wavelengths propagating within a fiber optic communication network. The stack structure eliminates or at least ameliorates the shortcomings associated with the prior art. The stack comprises a first layer comprising a silicon or silica substrate, a second layer comprising an undercladding layer, a third layer comprising a core glass layer, and a fourth layer comprising an overcladding layer. In another embodiment, the stack comprises a first layer comprising a silicon or silica substrate, a second layer comprising an undercladding layer, a third layer comprising a polymer layer, a fourth layer comprising a core glass layer, and a fifth layer comprising an overcladding layer.

The invention also provides an integrated optical add/drop multiplexer (OADM) comprising a substrate, an undercladding layer disposed on the substrate, a core glass layer disposed on a portion of the undercladding layer, and an overcladding layer disposed on the undercladding layer and the core glass layer. The core glass layer includes an arrayed waveguide grating (AWG) and the overcladding layer comprises a polymer and includes an optical switch.

The invention also provides an integrated optical add/drop multiplexer (OADM) comprising a substrate, an undercladding layer disposed on the substrate, a core glass layer disposed on a portion of the undercladding layer, a polymer layer disposed on the undercladding layer adjacent the core glass layer, and an overcladding layer disposed on the polymer layer and the core glass layer. The core glass layer includes an arrayed waveguide grating (AWG) and the polymer layer includes an optical switch.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION

The present invention provides an integrated, high-performance OADM by combining the favorable properties of glass optical waveguides and polymer-based digital optical switches. Planar glass technologies are most suited to the fabrication of AWGs, as they provide low optical loss. However, planar glass technologies frequently suffer from polarization dependence caused by the stress of the fabrication process. Digital optical switches are best implemented in polymers because of their large thermo-optic effect and low thermal conductivity. Furthermore, when low-loss index-matching polymers are used as a top cladding layer for glass-based AWG devices, they can provide benefits such as lowering the overall stress in the device, which reduces the polarization dependence, and lowering the temperature sensitivity of the device, which simplifies temperature control issues.

Preferably, the polymer materials for the top cladding application will have a refractive index at the use temperature and wavelength that is 0.5–0.7% less than that of the core glass layer, an optical loss at use wavelengths that is preferably equal to or less than that of the core glass layer (typically 0.1 dB/cm or less), a large ($>1\times10^{-4}/°$ C.), negative thermo-optic coefficient (dn/dT), a low elastic modulus to provide low stress on the silica layers, good adhesion to the glass core and cladding layers, and the ability to be metallized with typical metals used for thermo-optic switches such as chrome and gold. There are a few materials that come close to meeting all of these criteria. One example are halofluorinated diacrylates, such as the chlorofluorodiacrylates developed by AlliedSignal, which include the applications of Wu et al., U.S. application Ser. No. 08/842,783, filed Apr. 17, 1997, entitled "New Photocurable Halofluorinated Acrylates", and U.S. application Ser. No. 09/190,194 now U.S. Pat. No. 6,166,156, filed Nov. 12, 1998, entitled "New Method for Making Photocurable Halofluorinated Acrylates", both of which are hereby incorporated by reference. These materials have a refractive index at 1550 nm and 70° C. of approximately 1.44, meeting well the refractive index criteria above. The optical loss of this polymer is between 0.1 and 0.2 dB/cm at 1550 nm, dn/dT is approximately $-2\times10^{-4}/°$ C., and good adhesion to glass and silicon oxide substrates has been achieved.

Figure 1:
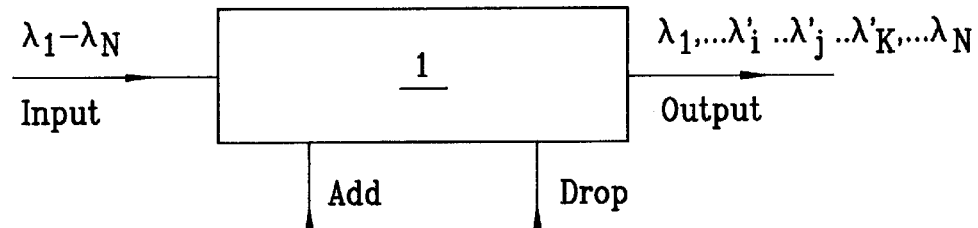
FIG. 1 is a block diagram of a conventional OADM.
Figure 2:
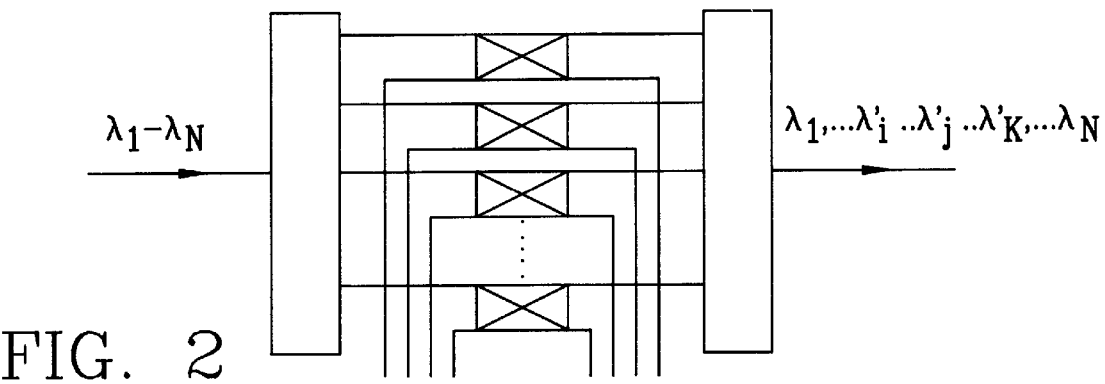
FIG. 2 is a diagram of a common OADM architecture.
Figure 3:
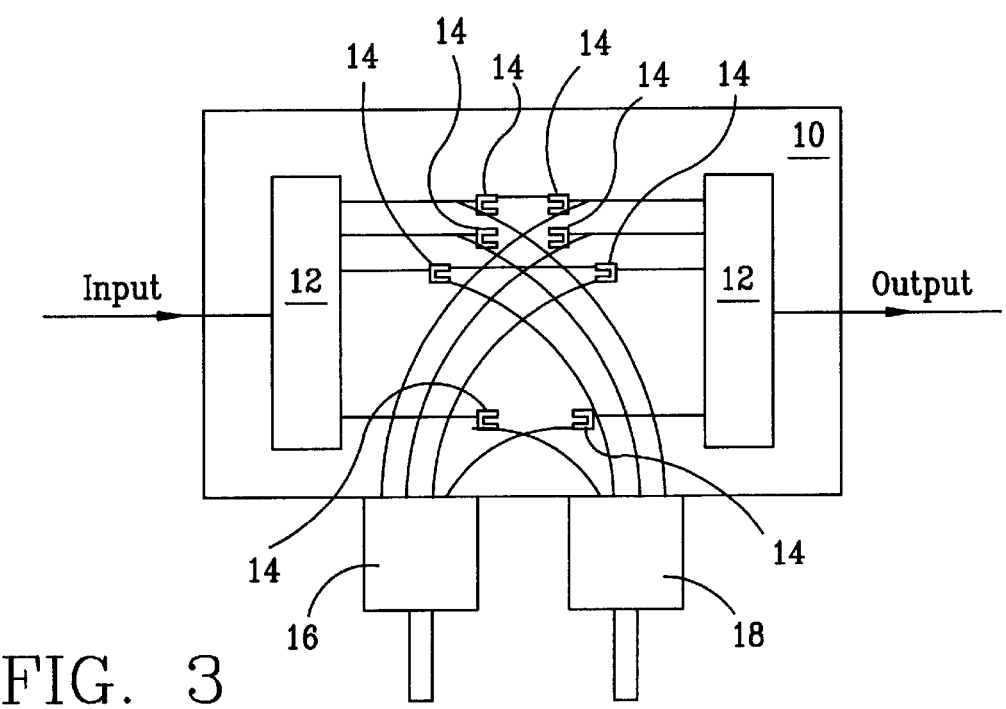
FIG. 3 is a diagram of an integrated OADM according to the present invention.

A schematic of the invention is shown in FIG. 3. Polymer-based digital optical switches 14 are "add/drop" 2×2s, rather than full crossbar 2×2s, since the two states of the switch are the "through" state and the "add/drop" states, respectively. A polymer overcladding (shown in FIG. 4 as polymer overcladding 24) is applied everywhere in the device and also serves as a segmented core in the switching regions (which are fairly short). Fiber arrays (shown in FIG. 3 as Add fiber array 16 and Drop fiber array 18) are aligned to substrate 10 at the add and drop ports to provide access to detectors and lasers which, in another embodiment, can be integrated as well.

Figure 4:
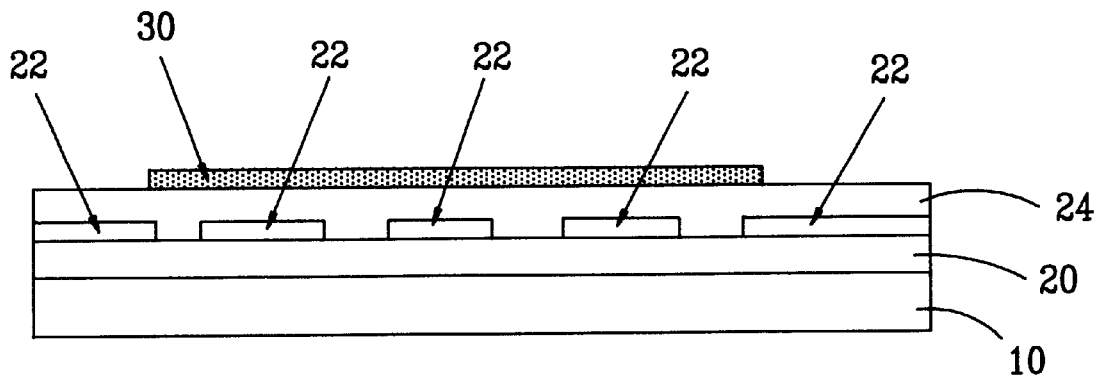
FIG. 4 is a side view of an embodiment of the present invention that includes a substrate, an undercladding layer disposed on the substrate, a core glass layer disposed on a portion of the undercladding layer, and an overcladding layer disposed on the undercladding layer and the core glass layer.

The integrated OADM of the invention is a multilayer stack. A side view of an embodiment of the invention is shown in FIG. 4. The integrated OADM illustrated in FIG. 4 uses a single polymer approach, wherein the overcladding layer 24 serves as a top cladding and also contains optical switches. As shown in FIG. 4, the first layer of the multilayer stack is a silicon or silica substrate 10. The second layer is an undercladding layer 20, which can also be a buffer glass layer, formed, for example, by chemical vapor deposition (CVD) or flame hydrolysis. The third layer is a glass core layer 22 that can be defined by reactive ion etching (RIE) as part of a semiconductor type fabrication process, and patterned as conventional AWGs. Glass core layer 22 can also be defined by ion exchange, which does not require the removal of material to make the core. The fourth layer of the multilayer stack is an overcladding layer 24. Overcladding layer 24 can be formed by spin-coating and subsequent ultraviolet curing/thermal annealing. FIG. 4 also illustrates a heater 30, preferably a metal heater, disposed on the overcladding layer 24. Heater 30 can be patterned using conventional lithographic processes.

The output of the demultiplexing AWG on the input side of the structure is N waveguides, where N is the number of wavelength channels. These waveguides lead to the switching region. In the switching region, the glass core is segmented to provide gaps into which polymer material is deposited during the subsequent overcladding spin-coating process. The gaps in the segmented waveguide region are designed to provide digital switching action, reasonably low insertion loss, and low return loss. In the case of the single polymer approach, this polymer must simultaneously be a suitable top cladding material, provide low insertion loss, reduce polarization dependence, and reduce temperature sensitivity. These constraints are removed if two different polymers are used, i.e., a first polymer is used for filling the gaps of the segmented glass core and a second polymer is used as a top cladding.

Figure 5:
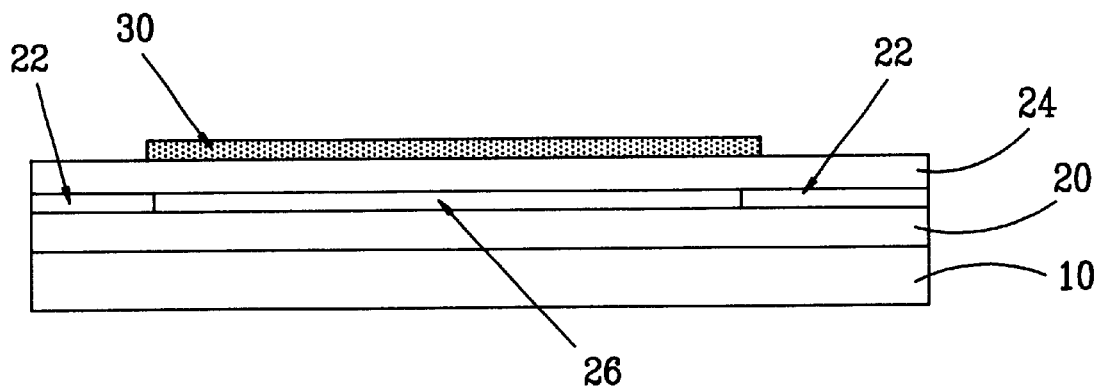
FIG. 5 is a side view of another embodiment of the present invention that includes a substrate, an undercladding layer disposed on the substrate, a core glass layer disposed on a portion of the undercladding layer, a polymer layer disposed on the undercladding layer adjacent the core glass layer, and an overcladding layer disposed on the polymer layer and the core glass layer.

A side view of the two polymer approach is shown in FIG. 5. As shown in FIG. 5, the integrated OADM has a first polymer, polymer layer 26, disposed between undercladding layer 20 (and adjacent core glass layer 22) and a second polymer, overcladding layer 24. In this approach, the refractive index of polymer layer 26 is adjusted to match the refractive index of glass core layer 22, while the index of overcladding layer 24 is adjusted to match the index of undercladding layer 20. Polymer layer 26 can be formed by spin-coating and subsequent ultraviolet curing/thermal annealing. Additionally, the polymer layer 26 can be patterned, with direct lithography or reactive ion etching techniques, to further ensure low-loss singlemode operation of the optical switch portion of the OADM.

The patterning of the polymer layer can proceed via standard photolithographic steps. After the core glass layer has been patterned and the region for the polymer waveguides cleared of core layer glass, the polymer core layer can be spun onto the substrate. The polymer will preferably have an excellent ability to planarize, in which case the height of the polymer layer and the glass core can be made nearly the same. In the preferred case of direct lithography, the substrate with uncured polymer film is placed in a nitrogen purged mask aligning compartment. The required photomask is brought into contact with the substrate and adjusted so that good alignment is achieved with the cores of the glass waveguides. UV radiation is then provided, which cures the polymer in the clear regions of the mask (coinciding to the positions of the waveguide cores). The mask is removed and the substrate is developed with common organic solvents such as methanol or acetone. The top cladding layer is then applied by spin coating over the hybrid polymer/glass structure. In a preferred embodiment, the core polymer layer index will match that of the core glass at the use temperature and wavelength(s). In the case of a polymer that cannot be directly photodefined, a different approach such as reactive ion etching (RIE) must be pursued. In this case, a uniform film of polymer is spun and dried, to which is added an evaporated layer of metal (often a titanium/gold combination). A photoresist is applied on the metal layer and patterned in a manner similar to the direct photolithographic layer described above. The metal is removed with a metal etchant in regions that will be removed by RIE. Finally, RIE is applied to remove the unwanted material and form the polymer waveguide core. Photoresist and metal residues are removed using wet chemical etchants, and the resulting polymer waveguide core is then covered with a top cladding layer as discussed above.

Figure 6:
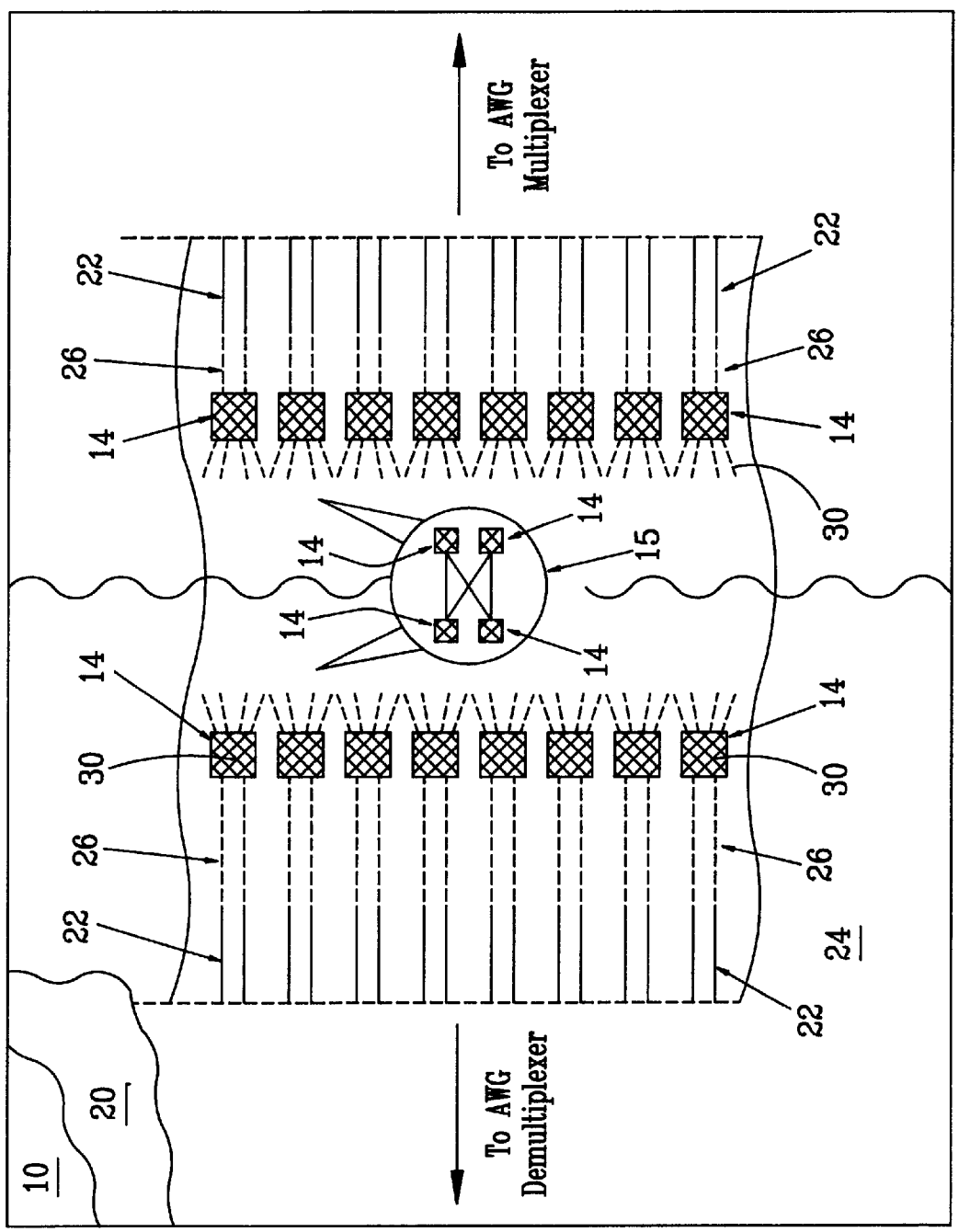
FIG. 6 is a top view of another embodiment of the present invention that includes a substrate, an undercladding layer disposed on the substrate, a core glass layer disposed on a portion of the undercladding layer, a polymer layer disposed on the undercladding layer adjacent the core glass layer, and an overcladding layer disposed on the polymer layer and the core glass layer.

FIG. 6 illustrates a top view of a single polymer approach embodiment of the present invention. As shown in this figure, undercladding layer 20 is disposed on substrate 10. Core glass layer 22 is disposed on a portion of undercladding layer 20 and polymer layer 26 is disposed on the undercladding layer adjacent the core glass layer. The polymer layer 26 include an optical switch 14, shown in FIG. 6 as 1×2 digital optical switches. Each of the switches 14, as shown in FIG. 6, may also include a metal heater 30. The inset of FIG. 6 illustrates a 2×2 switch 15 composed of four 1×2 switches 14. Overcladding layer 24 is disposed on polymer layer 26 and core glass layer 22.

The present invention provides an integrated, high-performance OADM that is compact in size by virtue of using polymer-based digital optical switches. The OADM of the invention has the advantages of low power consumption, reduced polarization dependence in the AWG region, reduced thermal sensitivity in the AWG region, reduced stress in the device overall, reduced cost over non-integrated OADMs, lower crosstalk than available from Mach-Zehnder embodiments, ability to readily adopt more flexible and complex switching elements, much lower loss than in a pure polymer embodiment, and lower loss than can be achieved stringing together conventional off-the-shelf components.

The present invention can best be understood by those skilled in the art by reference to the above description and figures, both of which are not intended to be exhaustive or to limit the invention to the specific embodiments disclosed. The figures are chosen to describe or to best explain the principles of the invention and its applicable and practical use to thereby enable others skilled in the art to best utilize the invention.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. An optical device comprising:
   a substrate,
   an undercladding layer above the substrate,
   a core glass layer above the substrate, the core glass layer including at least one waveguide, the at least one waveguide including a segmented core region wherein the core glass layer has gaps, and
   an overcladding layer, the overcladding layer comprising a polymer, the polymer of the overcladding layer filling the gaps of the segmented core region of the waveguide.

2. The optical device of claim 1 further comprising a heater, the heater being operative to change the temperature of the polymer of the overcladding layer.

3. The optical device of claim 1 wherein the polymer-filled segmented core waveguide is operative as an optical switch.

4. The optical device of claim 1 wherein the core glass layer includes an arrayed waveguide grating (AWG).

5. An optical device comprising:
   a substrate,
   an undercladding layer above the substrate,
   a core glass layer above the undercladding layer, the core glass layer including at least one integrated optical element,
   a polymer core layer above the undercladding layer and adjacent to the core glass layer, the polymer core layer including at least one integrated optical element, and
   an overcladding layer above the core glass layer and the polymer core layer, wherein at least one integrated optical element of the core glass layer is coupled to at least one integrated optical element of the polymer core layer.

6. The optical device of claim 5 further comprising a heater, the heater being operative to change the temperature of the polymer core layer.

7. The optical device of claim 5 wherein the overcladding layer comprises a polymer.

8. The optical device of claim 5 wherein the core glass layer includes an arrayed waveguide grating (AWG).

9. The optical device of claim 5 wherein the polymer core layer includes an optical switch.

10. The optical device of claim 5 wherein the polymer core layer has an index of refraction identical to an index of refraction of the core glass layer.

11. The optical device of claim 5 wherein the overcladding layer has an index of refraction identical to an index of refraction of the undercladding layer.

12. An integrated optical add/drop multiplexer (OADM) comprising:
   a substrate;
   an undercladding layer disposed on the substrate, the undercladding layer having a refractive index;
   a core glass layer disposed on a portion of the undercladding layer, the core glass layer having a refractive index, the core glass layer including
   a demultiplexer having a plurality of output waveguides,
   at least one optical switch, each optical switch having an input, an output, an add waveguide, and a drop waveguide, each optical switch including a segmented core region wherein the core glass layer has gaps, the input of each optical switches being coupled to an output waveguide of the demultiplexer, and
   a multiplexer, each multiplexer having a plurality of input waveguides, the output of each optical switch being coupled to one of the plurality of input waveguides, wherein each input waveguide not coupled to one of the optical switches is coupled to one of the demultiplexer output waveguides not coupled to one of the optical switches; and
   an overcladding layer disposed on the undercladding layer and the core glass layer, the overcladding layer comprising a polymer having a refractive index and a thermo-optic coefficient, the polymer filling the gaps in the segmented core region of each optical switch.

13. The integrated optical add/drop multiplexer of claim 12 wherein the multiplexer is a multiplexing arrayed waveguide grating (AWG) and the demultiplexer is a demultiplexing arrayed waveguide grating (AWG).

14. The integrated optical add/drop multiplexer of claim 12 wherein the substrate comprises silicon or silica.

15. The integrated optical add/drop multiplexer of claim 12 wherein the refractive index of the undercladding layer is identical to the refractive index of the polymer.

16. The integrated optical add/drop multiplexer of claim 12 wherein the polymer comprises a polymerized halofluorinated diacrylate.

17. The integrated optical add/drop multiplexer of claim 12 further comprising:
   a first fiber array aligned to the substrate and coupled to the add waveguides of the digital optical switches, and
   a second fiber array aligned to the substrate and coupled to the drop waveguides of the digital optical switches.

18. The integrated optical add/drop multiplexer of claim 12 wherein the number of optical switches is equal to the number of demultiplexer output waveguides and is equal to the number of multiplexer input waveguides; wherein each demultiplexer output waveguide is coupled to an input of one of the digital optical switches; and wherein each multiplexer input waveguide is coupled to an output of one of the digital optical switches.

19. The integrated optical add/drop multiplexer of claim 12 wherein each optical switch is a digital optical switch.

20. The integrated optical add/drop multiplexer of claim 12 wherein the refractive index of the polymer is between 0.5 and 0.7% less than the refractive index of the core glass layer.

21. The integrated optical add/drop multiplexer of claim 12 wherein the thermo-optic coefficient of the polymer is negative, and the absolute value of the thermo-optic coefficient of the polymer is greater than $1 \times 10^{-4}/^\circ$ C.

22. The integrated optical add/drop multiplexer of claim 12 wherein the polymer has an optical loss of 0.2 dB/cm or less at 1550 nm.

23. An integrated optical add/drop multiplexer (OADM) comprising:
   a substrate;
   an undercladding layer disposed on the substrate, the undercladding layer having a refractive index;
   a core glass layer disposed on a portion of the undercladding layer, the core glass layer having a refractive index, the core glass layer including
      a demultiplexer having a plurality of output waveguides, and
      a multiplexer, each multiplexer having a plurality of input waveguides; and
   a polymer core layer having a refractive index and a thermo-optic coefficient disposed on the undercladding layer adjacent the core glass layer, the polymer core layer including at least one waveguide, the at least one waveguide forming at least one optical switch, each optical switch having an input, an output, an add waveguide, and a drop waveguide, the input of each optical switch being coupled to an output waveguide of the demultiplexer; and
   an overcladding layer disposed on the polymer core layer and the core glass layer, wherein the output of each optical switch is coupled to one of the plurality of input waveguides, wherein each input waveguide not coupled to one of the optical switches is coupled to one of the demultiplexer output waveguides not coupled to one of the optical switches.

24. The integrated optical add/drop multiplexer of claim 23 wherein the multiplexer is a multiplexing arrayed waveguide grating (AWG) and the demultiplexer is a demultiplexing arrayed waveguide grating (AWG).

25. The integrated optical add/drop multiplexer of claim 23 wherein the substrate comprises silicon or silica.

26. The integrated optical add/drop multiplexer of claim 23 wherein the refractive index of the polymer core layer is identical to an index of refraction of the core glass layer.

27. The integrated optical add/drop multiplexer of claim 23 wherein the overcladding layer has an index of refraction identical to an index of refraction of the undercladding layer.

28. The integrated optical add/drop multiplexer of claim 23 wherein the thermo-optic coefficient of the polymer core layer is negative, and the absolute value of the thermo-optic coefficient of the polymer is greater than $1 \times 10^{-4}/^\circ$ C.

29. The integrated optical add/drop multiplexer of claim 23 wherein the polymer core layer has an optical loss of 0.2 dB/cm or less at 1550 nm.

30. The integrated optical add/drop multiplexer of claim 23 wherein the polymer core layer comprises a polymerized halofluorinated diacrylate.

31. The integrated optical add/drop multiplexer of claim 23 further comprising:
   a first fiber array aligned to the substrate and coupled to the add waveguides of the optical switches, and
   a second fiber array aligned to the substrate and coupled to the drop waveguides of the optical switches.

32. The integrated optical add/drop multiplexer of claim 23 wherein the number of optical switches is equal to the number of demultiplexer output waveguides and is equal to the number of multiplexer input waveguides; wherein each demultiplexer output waveguide is coupled to an input of one of the optical switches; and wherein each multiplexer input waveguide is coupled to an output of one of the optical switches.

33. The integrated optical add/drop multiplexer of claim 23 wherein each optical switch is a digital optical switch.

* * * * *